United States Patent [19]
Calfo et al.

[11] 4,258,281
[45] Mar. 24, 1981

[54] LAMINATED FLUX SHUNT FOR DYNAMOELECTRIC MACHINE STATOR

[75] Inventors: Raymond M. Calfo, Bradock Hills; Arthur Mulach, Penn Hills; Frank P. Fidei, Forest Hills; James G. Minto, Penn Hills, all of Pa.

[73] Assignee: Westinghouse Electric Corp., Pittsburgh, Pa.

[21] Appl. No.: 67,249

[22] Filed: Aug. 17, 1979

[51] Int. Cl.³ .............................................. H02K 1/12
[52] U.S. Cl. .................................................. 310/256
[58] Field of Search ....................... 310/254, 256, 260; 336/84 R, 84 M

[56] References Cited

U.S. PATENT DOCUMENTS

| | | | |
|---|---|---|---|
| 1,677,004 | 7/1928 | Pohl | 310/256 |
| 1,689,187 | 10/1928 | Pohl | 310/256 |
| 1,689,188 | 10/1928 | Pohl | 310/256 |
| 1,816,795 | 7/1931 | Pohl | 310/256 |
| 2,310,510 | 2/1943 | Waldvogel | 310/256 |
| 2,795,714 | 6/1957 | Baudry | 310/256 |
| 3,100,271 | 8/1963 | Darrieus et al. | 310/256 |
| 3,114,063 | 12/1963 | Karsten | 310/256 |
| 3,731,127 | 5/1973 | Harrington | 310/254 |

FOREIGN PATENT DOCUMENTS 475810  5/1929  Fed. Rep. of Germany ........... 310/256

*Primary Examiner*—Mark O. Budd
*Attorney, Agent, or Firm*—F. J. Baehr, Jr.

[57] ABSTRACT

In a generator a plurality of laminations are disposed adjacent the stator teeth to extend radially outwardly from the rotor and generally perpendicular to the stator laminations to form a flux shunt to prevent fringing flux from entering the core perpendicular to the stator laminations.

6 Claims, 12 Drawing Figures

LAMINATED FLUX SHUNT FOR DYNAMOELECTRIC MACHINE STATOR

BACKGROUND OF THE INVENTION

This invention relates to dynamoelectric machines and more particularly to a flux shunt for large generators.

In the end turn region of large generators stray magnetic flux, both from the rotor field winding and from the currents flowing in the stator coils, follow undesirable patterns. This stray flux contains axial components, which penetrate the stator end tooth region causing additional losses and heating therein. As ratings and machine sizes have increased, this eddy loss heating has become a serious problem. Historically, the problem was managed in the stator tooth area by slitting the last few inches of the core iron and by stepping the stator core end packs. Recent attempts to provide additional cooling in this area will be satisfactory for existing ratings and machine sizes. Other schemes have utilized flux shields in the tooth portion of the stator core. These are typically copper plates or loops situated directly in front of the stator teeth. These shields are conductive members of low magnetic permeability and arranged to produce circulating currents therein which form a shielding magnetic field diverting the stray currents away from this region of the stator. For high rated machines, the currents induced in these types of shields produce extremely high losses, many times higher than that normally seen in the stator end iron. In most cases, liquid cooling of these shields is required.

Conventional schemes for reducing this type of loss, such as slitting the iron or accepting the loss and adding interlaminar cooling ducts can only be accomplished during the manufacture of the stator core. For machines that have already been built an alternative scheme is required to reduce the adverse effects of stray magnetic flux systems hereinbefore described.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENTS

Figure 1:
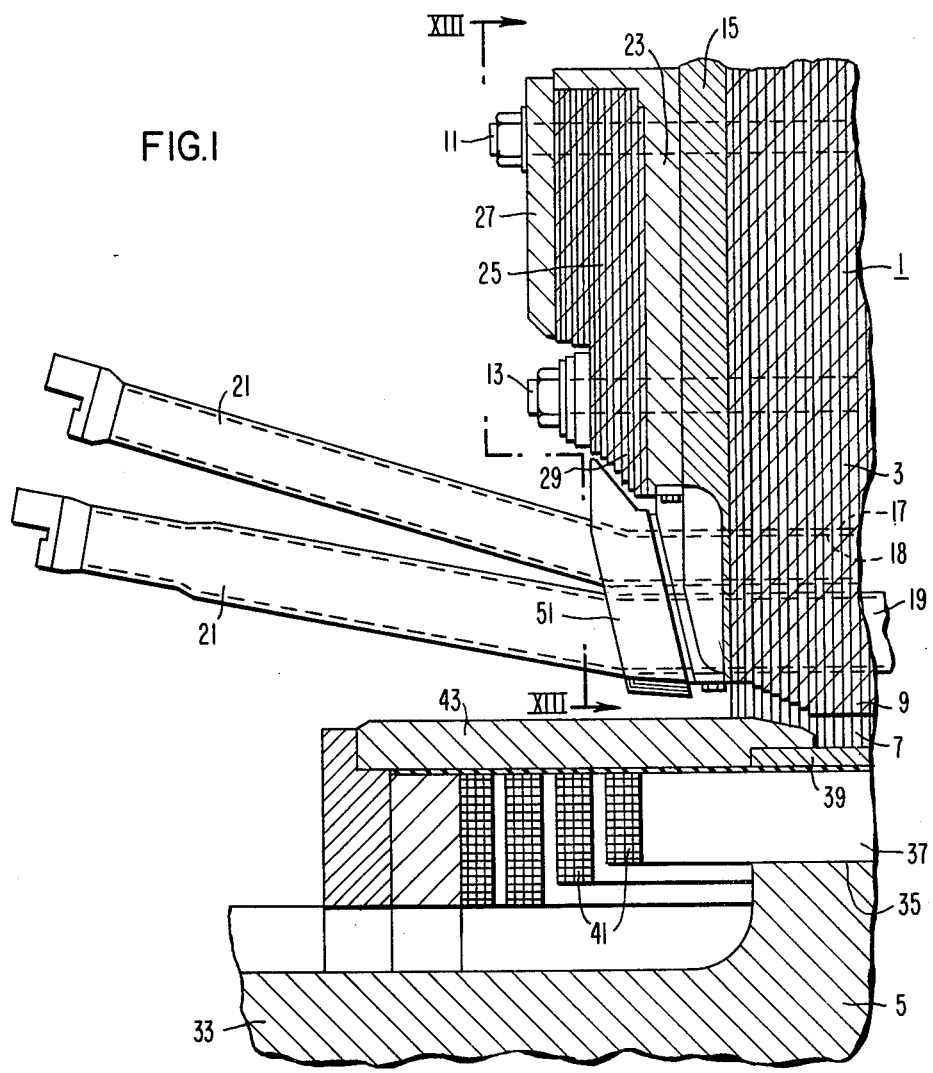
FIG. 1 is a partial sectional view of a dynamoelectric machine having a flux shunt made in accordance with this invention disposed therein.

Referring now to the drawings in detail and in particular to FIG. 1, there is shown an end region of a dynamoelectric machine such as a large generator which comprises a stator 1 having a core 3 and a rotor 5 encircled by the core 3 with a gap 7 disposed therebetween.

The core 3 comprises a plurality of sheets or laminations 9 electrically insulated with a surface coating and stacked on building bolts 11 and firmly clamped together by insulated through bolts 13 which apply pressure through non-magnetic finger plates 15. The core laminations 9 have a plurality of slots 17 disposed to extend radially outwardly from the radially inner margin. The slots 17 are aligned to form an axial groove 18 for conductors 19 which extends axially through the core 3 and are connected by end turns 21 to form the stator windings. The portions of the lamination between the grooves are called teeth 20. The conductors 19 are held in the grooves 18 by slot wedges (not shown). Outboard of the finger plates 15 is an end plate 23, end shield 25 and core support plate 27. The end shield 25 is formed from a plurality of laminations, which are stacked to form steps 29, which ascend radially and axially outwardly from the core 3. The stator core end laminations 9 are also disposed to form steps 31, which ascend radially and axially outwardly toward the end of the core 3.

The rotor 5 comprises a shaft 33 having a plurality of axial grooves 35 extending radially inwardly from the outer periphery. Conductors 37 are disposed in the axial grooves 35 and are retained therein by rotor wedges 39. The conductors 37 are connected by rotor end turns 41 to form the field windings. A retainer ring 43 encircles the rotor end turns 41 to support them against the centrifugal forces induced by the rotation of the rotor 5.

A plurality of flux shunts 51 are disposed on the end of the core adjacent the teeth 20 and between the end turns 21 of the stator windings. The radially inner end of the flux shunt 51 is generally disposed adjacent the radially inner periphery of the core 3 and the flux shunt 51 extends radially and axially outwardly to adjacent the steps 29 of the end shields 25. The flux shunt 51, as shown in FIGS. 2 and 3, comprises a plurality of magnetic, electrically insulated sheets or laminations 53 bonded together and stacked so that they are generally normal or perpendicular to the core laminations and are radially oriented.

Figure 4:
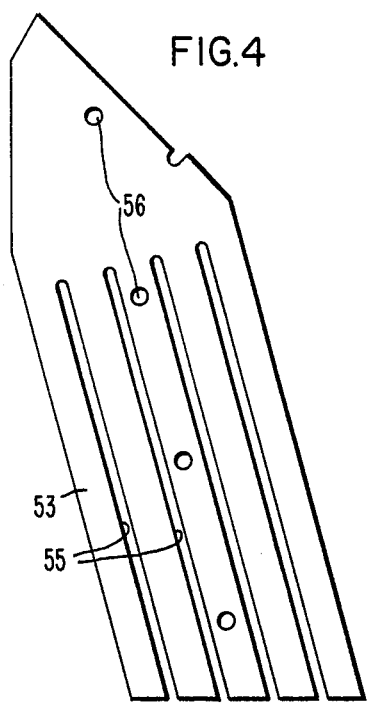
FIG. 4 is an enlarged elevational view of a lamination utilized to form the flux shunt.
Figure 5:
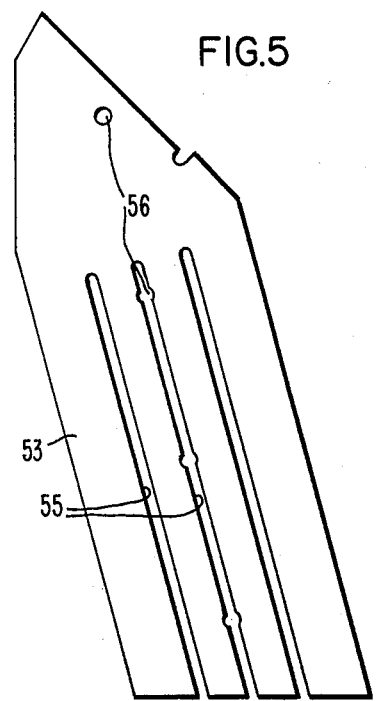
FIG. 5 is an enlarged elevational view of another lamination utilized to form the flux shunt.
Figure 6:
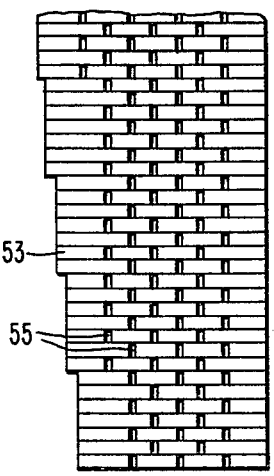
FIG. 6 is an enlarged partial bottom view of the flux shunt.

As shown in FIGS. 4, 5 and 6 the laminations 53 have a plurality of slots 55 extending radially outwardly from their radially inner margins. The number and/or disposition of slots 55 in adjacent laminations differ so that when stacked the slots 55 are staggered. The laminations 53 have holes 56 which fit over bolts 57 to form the shunts 51. The laminations 53 are stacked so as to form steps 58 and 59, respectively, on the radially inner end and the axially outer sides of the shunt 51.

Figure 2:
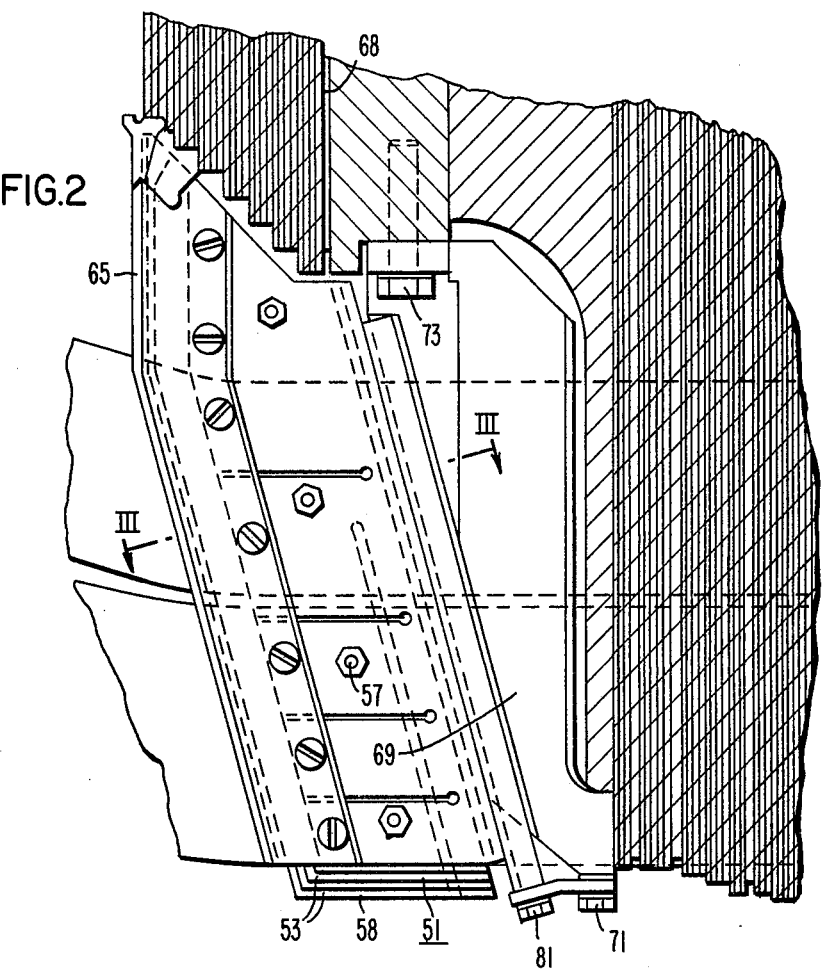
FIG. 2 is an enlarged elevational view of the flux shunt.
Figure 3:
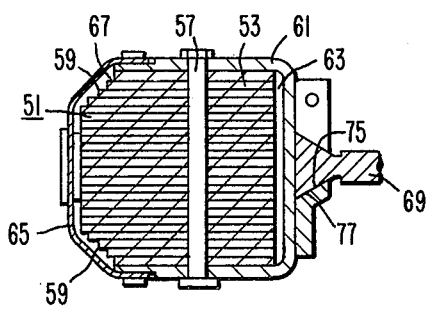
FIG. 3 is a sectional view taken on line III—III of FIG. 2.

As shown in FIGS. 2 and 3 the laminations 53 are disposed in a channel 61 or side plates and are held there by the bolts 57 to form a cooling duct 63 on one side of the laminations 53. A cover plate 65 is connected to the channel 61 and forms a cooling duct 67 on the other side of the laminations 53. The cooling ducts 63 and 67 cooperate with vents 68 in the end shield 25 to direct cooling fluid over the shunt 51. A mounting bracket 69 is attached to the finger plate 15 and to the end plate 23 by bolts 71 and 73, respectively, and the shunt 51 is attached to the mounting bracket 69 by tongue 75 and groove 77 arrangement which cooperates with a wedge (not shown) and cap screw 81 to attach the shunt to the mounting bracket 69.

Figure 7:
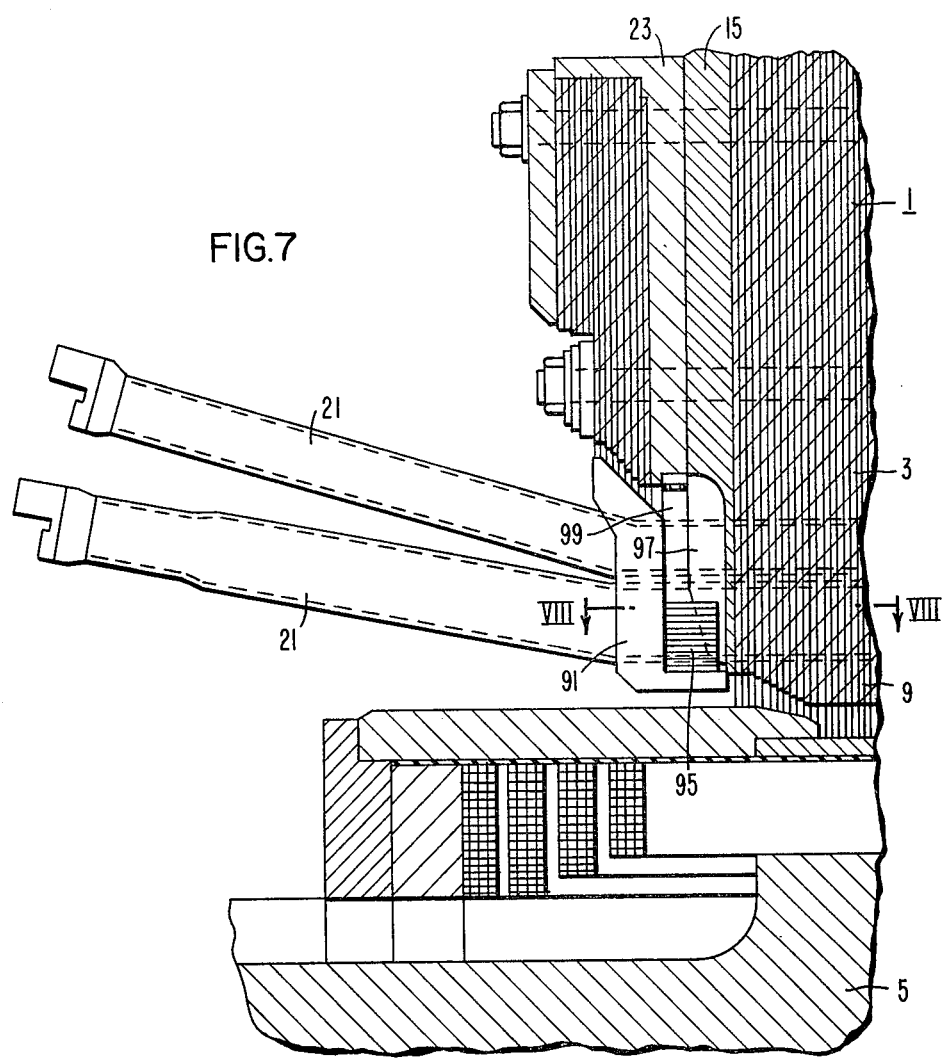
FIG. 7 is a partial elevational view of a dynamoelectric machine having an alternate flux shunt disposed therein.
Figure 8:
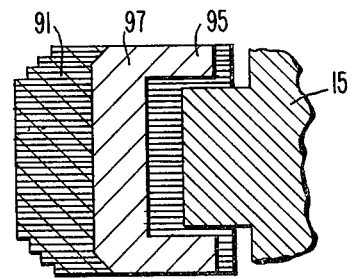
FIG. 8 is an enlarged sectional view taken on line VIII—VIII of FIG. 7.

Referring now to FIGS. 7 and 8 there is shown a flux shunt 91 disposed on the end of the core 3 adjacent the teeth between the core end turns 21. The radially inner end of the flux shunt 91 is generally disposed adjacent the radially inner periphery of the core and the flux shunt 91 extends axially and radially outwardly to adjacent the steps 29 of the end shield 25. The flux shunt 91 comprises a plurality of generally L-shaped sheets or laminations generally radially oriented and stacked generally perpendicular to the core laminations 9.

A second flux shunt 95 is attached to the flux shunt 91 by an adhesive or other material. The second flux shunt 95 is formed from a plurality of generally C-shaped sheets or laminations 97 generally axially oriented and disposed generally perpendicular to the core laminations 9.

A main bracket 99 is attached to the finger plate 15 and the end plate 23 by bolts 101. The mounting bracket 99 is attached to the flux shunt 91 by tongue and groove or other arrangements.

Figure 9:
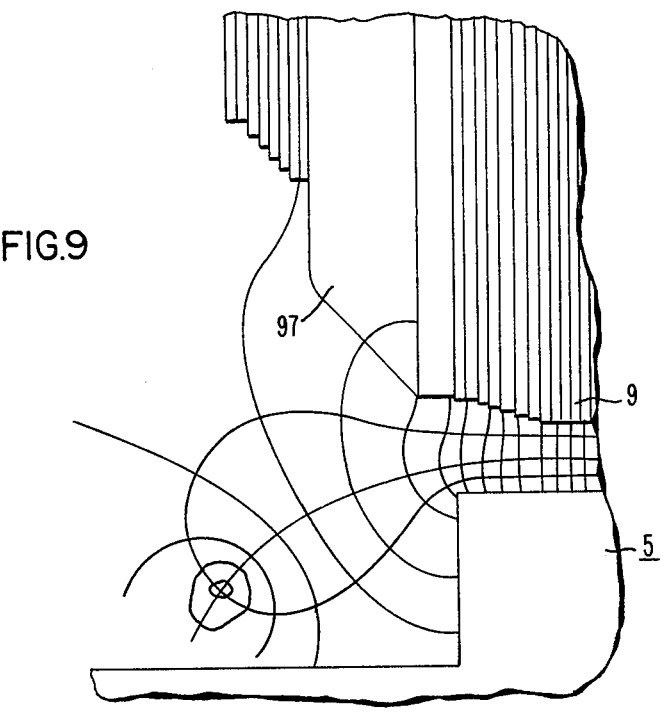
FIG. 9 is a schematic view showing the flux pattern at the end of the stator caused by the end turns where no shunt is utilized.
Figure 10:
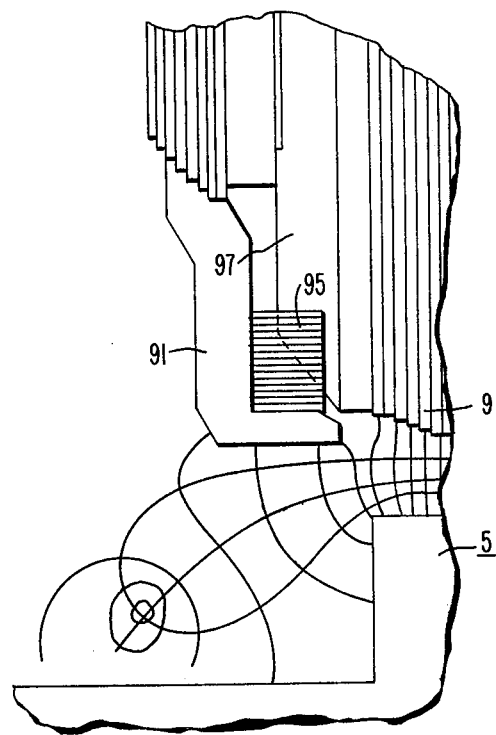
FIG. 10 is a schematic view of the flux pattern at the end of the stator caused by the end turns with the flux shunt in place.
Figure 11:
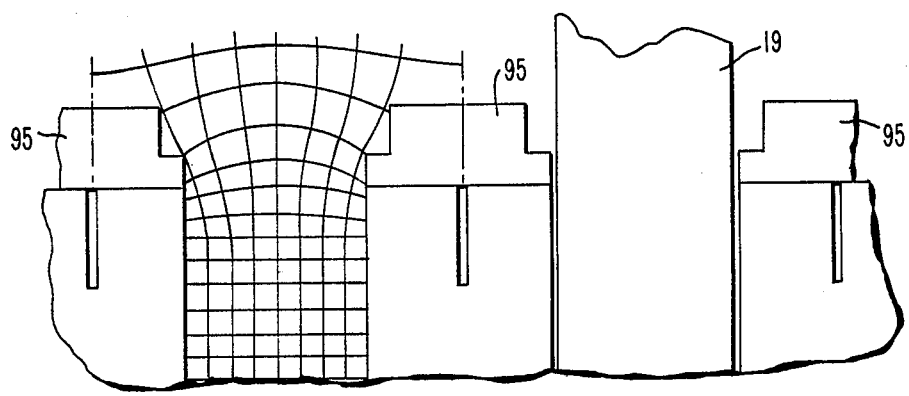
FIG. 11 is a schematic view showing the flux pattern at the end of the stator core caused by the stator end turns without the flux shield in place.
Figure 12:
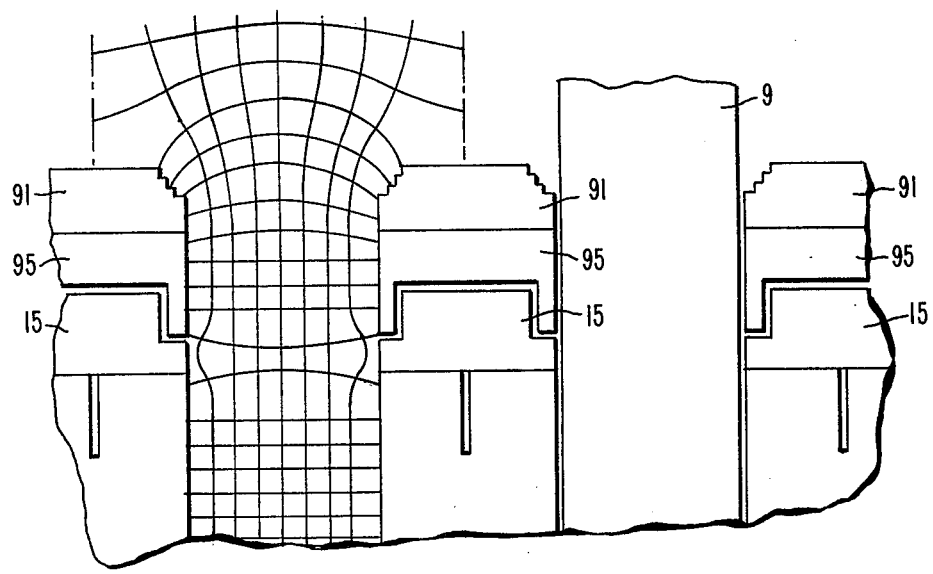
FIG. 12 is a schematic view showing the flux pattern at the end of the stator core caused by the end turns with the flux shield in place.

The operation of the flux shunts 51 and 91 are shown schematically in FIGS. 9 and 10 wherein the rotor stator fringing flux is directed to shunts 51 or 91 rather than to the stator core 3 generally perpendicular to the stator laminations 9. FIGS. 11 and 12 schematically show the fringing flux from the stator conductors 19 being directed to the flux shunt 95 rather than perpendicular to the stator laminations 9. The shunts 51, 91 and 95 are formed of material having a high magnetic permeability whereby the laminations collect the stray magnetic flux from the stator and rotor end turns and divert it so that it flows generally parallel to the main synchronous flux in planes transverse to the rotor axis, as shown in FIG. 10.

The flux shunt 95 tends to collect and divert the stator magnetic fringing flux from the axial oriented conductors at the end of the stator core to the shunt so that the main phase belt leakage flux is in a plane perpendicular to the rotor axis as shown in FIG. 12.

What is claimed is:

1. An improved dynamoelectric machine having a stator with a plurality of laminations forming a core and a rotor disposed within the core with a gap therebetween, wherein the improvement comprises flux shunts disposed on both ends of said stator, each of said flux shunts comprising a set of generally "L" shaped laminations disposed generally perpendicular to the core laminations disposed in such a manner that the base of the "L" is directed toward the core laminations and is adjacent the rotor, the stem of the "L" extending radially outwardly, and a set of generally "U" shaped laminations disposed on the base of the "L" shaped laminations normal to the L shaped laminations and normal to the core laminations to reduce leakage flux entering the core normal to the plane of the core laminations.

2. An improved dynamoelectric machine as set forth in claim 1, wherein the flux shunts are disposed in a circular array extending radially outwardly from adjacent the radially inner margin of the stator core.

3. An improved dynamoelectric apparatus as set forth in claim 1, wherein the dynamoelectric apparatus has a plurality of axial conductors which extend axially beyond the core and are connected by end turns to form windings and the shunts are disposed between adjacent conductors.

4. An improved dynamoelectric machine as set forth in claim 1, wherein the laminations in the shunt have their axially outer margins disposed to form steps.

5. An improved dynamoelectric machine as set forth in claim 1, wherein the stator has finger plates and end plates disposed on the axial ends of the core laminations and the improvement further comprises brackets fastened to the finger and end plates and the shunts are affixed to said brackets.

6. An improved dynamoelectric machine as set forth in claim 1, wherein the U shpaed set of laminations is bonded to the L shaped mentioned set of laminations.

* * * * *